United States Patent

[11] 3,601,091

| [72] | Inventor | George G. Preckshot<br>Altadena, Calif. |
|------|----------|-----------------------------------------|
| [21] | Appl. No. | 850,958 |
| [22] | Filed | Aug. 18, 1969 |
| [45] | Patented | Aug. 24, 1971 |
| [73] | Assignee | Bell & Howell Company<br>Chicago, Ill. |

[54] MAGNETIC PRINTOUT EQUIPMENT
15 Claims, 2 Drawing Figs.

[52] U.S. Cl........................................... 118/636,
117/17.5, 118/637
[51] Int. Cl........................................... G03g 13/00
[50] Field of Search........................................ 118/636,
637; 117/17.5

[56] References Cited
UNITED STATES PATENTS
3,113,042  12/1963  Hall.............................. 118/637

2,832,311  4/1958  Byrne........................... 118/637
2,975,758  3/1961  Bird.............................. 118/637
3,257,223  6/1966  King............................. 118/637

*Primary Examiner*—Mervin Stein
*Assistant Examiner*—Leo Millstein
*Attorney*—Luc P. Benoit

ABSTRACT: Apparatus for conveying magnetizable toner particles from a toner supply to a toning region for toning magnetic images have a magnetic conveyor belt for advancing toner particles from the toner supply to the toning region. A toner guide shields the conveyor belt and guides the advancing toner particles, and a mechanism maintains the magnetic conveyor belt in spaced relationship to a portion of the toner guide in the vicinity of the toning region to reduce magnetic interference with magnetic images.

Patented Aug. 24, 1971 3,601,091

INVENTOR.
GEORGE G. PRECKSHOT
BY
ATTORNEY

MAGNETIC PRINTOUT EQUIPMENT

RELATED APPLICATIONS

Patent Application Ser. No. 850,959, Magnetic Toner, filed of even date herewith, by Thomas H. Garland, Frederick J. Jeffers, and John H. Rolker; which application has been assigned to the subject assignee and is herewith incorporated by reference herein.

BACKGROUND OF THE INVENTION

1. Field of the Invention

The invention relates to magnetic printout equipment and, more particularly, to equipment for toning magnetic images.

2. Prior Art

A multitude of efforts to provide imaging, copying and printing apparatus which operate through the intermediary of a magnetic image or record has created a strong need for magnetic printout equipment in which magnetizable toner particles are advanced from a toner supply to a surface on which the magnetic image or record appears and needs to be toned for a printout thereof.

Since the toner in question is susceptible to magnetic attraction, the suggestion arises to employ a magnetic conveyor for the advance of toner particles. Since such particles are difficult to remove from a magnetic conveyor the further suggestion arises to shield the magnetic conveyor by toner guiding means on or along which the toner particles can travel to the magnetic image or record to be toned.

This, in fact, is the underlying principle of certain apparatus for developing electrostatic images in which the requisite electroscopic toner is held in magnetic brushes composed of piles of streamers of mutually attracted magnetic particles. To date it was, however, not possible to employ apparatus of this type in the toning of magnetic images due to magnetic interferences created by the magnetic conveyor belt.

It is broadly an object of a first aspect of the subject invention to overcome this disadvantage and to provide suitable apparatus for conveying magnetizable toner particles for toning magnetic records or images.

Another problem arises within the subject context during the return of magnetic toner particles which have remained unspent in the toning process.

Conventionally, unspent magnetic particles have been dumped on an inclined surface leading back to the toner supply. In practice this does not consistently assure an orderly return of unspent toner particles to the supply; the main obstacles appearing to be the tendency of magnetic particles to cluster and the friction occurring between the particles or clusters and the inclined surface.

It is broadly an object of a second aspect of the invention to overcome the latter drawbacks and to provide suitable magnetic toning apparatus in which unspent toner particles are positively returned to the toner supply.

SUMMARY OF THE INVENTION

From a first aspect thereof, the invention provides, in apparatus for conveying magnetizable toner particles from a toner supply to a toning region for toning magnetic images at said toning region, the improvement comprising in combination a magnetic conveyor belt for advancing toner particles from said toner supply toward said toning region, toner guide means extending from said toner supply to said toning region for shielding said conveyor belt against contact by said toner particles and for guiding said advancing toner particles to said toning region, means for driving said conveyor belt and means engaging said magnetic conveyor belt for maintaining said magnetic conveyor belt in spaced relationship to a portion of said toner guide means in the vicinity of said toning region to reduce magnetic interference with said magnetic images.

From a second aspect thereof, the invention provides, in apparatus for toning in a toning region magnetic images on the surface of a magnetic image drum, the improvement comprising in combination means for containing a supply of magnetizable toner particles, toner guide means for guiding toner particles from said toner supply to said toning region and for guiding unspent toner particles from said toning region back to said toner supply, a magnetic conveyor belt mounted inside said toner guide means for attracting toner particles from said toner supply to said toner guide means and for moving said attracted toner particles along said toner guide means toward said toning region, and for attracting unspent toner particles at said toning region to said toner guide means and for moving said attracted unspent toner particles along said toner guide means to said toner supply, means for driving said conveyor belt, and means engaging said magnetic conveyor belt for maintaining said magnetic conveyor belt in spaced relationship to a portion of said toner guide means in the vicinity of said toning region to reduce magnetic interference with said magnetic images.

From a third aspect thereof, the invention provides, in apparatus for toning in a toning region magnetic images on the surface of a magnetic image drum, the improvement comprising in combination means for containing a supply of magnetizable toner particles, an enclosure of nonmagnetic material including toner guide means for guiding toner particles from said toner supply to said toning region and for guiding unspent toner particles from said toning region back to said toner supply, a magnetic conveyor belt mounted inside said toner guide means for attracting toner particles from said toner supply to said toner guide means and for moving said attracted toner particles along said toner guide means toward said toning region, and for attracting unspent toner particles at said toning region to said toner guide means and for moving said attracted unspent toner particles along said toner guide means to said toner supply, means for driving said conveyor belt, and means for increasing the pressure inside said enclosure relative to the outside of said enclosure.

Other inventive features will be pointed out or become apparent as this description proceeds.

The expression "magnetizable" as herein employed refers not only to materials which will retain an imposed magnetization, but also to materials which are subject to magnetic attraction but will not retain a magnetization after removal of the external magnetic field.

SHORT DESCRIPTION OF THE DRAWINGS

The invention will be more readily apparent from the following detailed description of a preferred embodiment thereof, illustrated by way of example in the accompanying drawings, in which:

FIG. 1 is a section through a magnetic toning apparatus according to the invention and also illustrates a magnetic image drum; and FIG. 2 is a side view, partially in section, of the apparatus shown in FIG. 1.

DESCRIPTION OF THE PREFERRED EMBODIMENT

Figure 1:
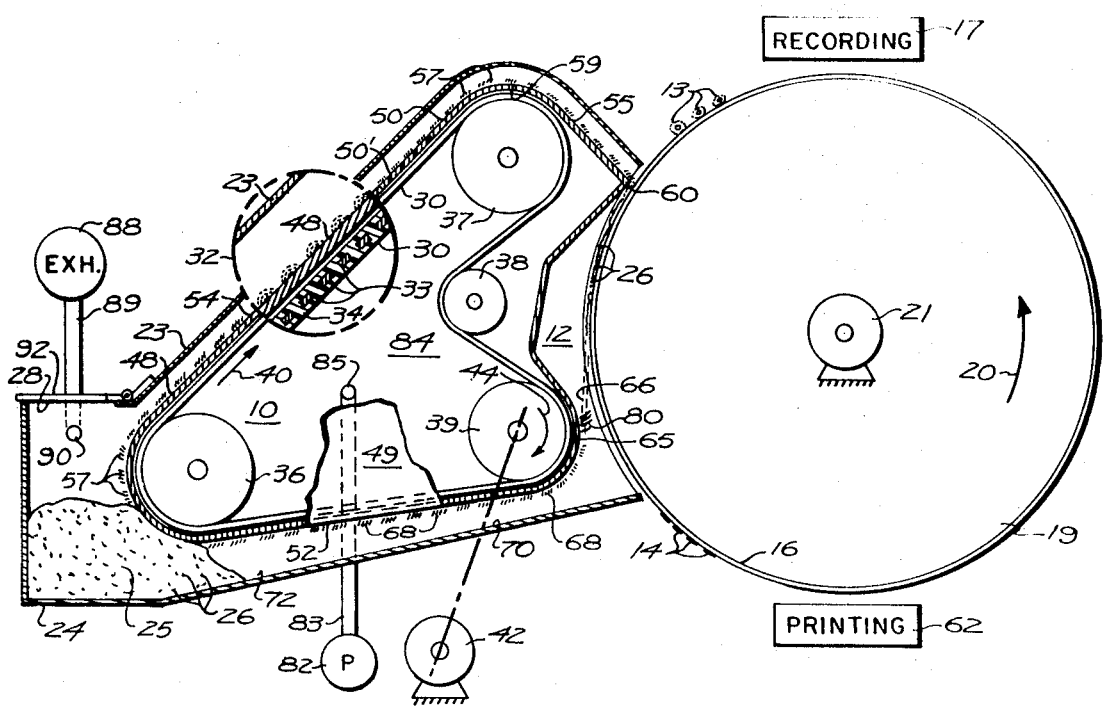
Figure 2:
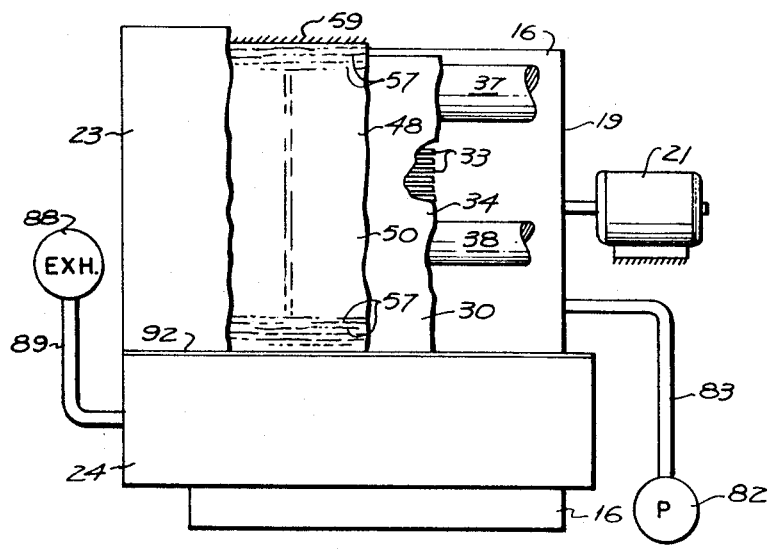

The toning apparatus 10 shown in FIGS. 1 and 2 has the purpose of toning, in a toning region 12, magnetic records or images 13, so as to provide corresponding toner images 14 that can be printed out onto such media as paper sheets to produce duplicates of original letters or other documents. In the illustrated embodiment the magnetic images 13 are formed on an endless magnetic recording medium 16 at a recording station 17. The recording medium 16 is disposed on a rotatable drum 19 which is rotated in the direction of arrow 20 by a drive 21.

The image drum 19 with recording medium 16, and the recording station 17 are only indicated schematically, since they may be composed of conventional means, such as those described in Schaffert, ELECTROPHOTOGRAPHY (Focal Press 1965), pp. 123–25. Alternatively, thermomagnetic imaging techniques and low-Curie point media such as those of the type disclosed in U.S. Pat. No. 2,793,135, Methods and Apparatus for Preparing a Latent Magnetic Image, by Sims et al., issued May 21, 1957, and British Pat. No. 1,139,232, Thermomagnetic Recording, by E. I. du Pont de Nemours & Co., published Jan. 8, 1969, may be employed for providing the magnetic images 13.

Upon rotation of the drum 19 the images 13 are moved into the toning region 12 for a toning thereof. For this purpose, the toning apparatus 10 includes a housing 23 which defines a bin 24 for containing a supply 25 of magnetizable toner particles 26. The supply 25 may be periodically replenished through an aperture 28 in the housing 23. Typically, the toner particles 26 are composed of small cores of ferromagnetic material (iron, cobalt, etc.) enclosed in fusible shells of a wax or thermoplastic to permit fusion of the toner to the printout sheet or paper.

A magnetic conveyor or belt 30 has the purpose of advancing toner particles 26 from the toner supply 25 toward the toning region 12. As illustrated on a magnified scale within the outline 32, the conveyor belt 30 shown by way of example in the preferred embodiment has a multitude of mutually spaced bar magnets 33 embedded in an endless elastomer sheet 34. The conveyor belt 30 is mounted by four rotatable rollers 36, 37, 38 and 39 and is advanced in the direction of the arrow 40 by a belt drive 42 which, by way of example, is coupled to the roller 39 and rotates the same in the direction of the arrow 44. To preclude contamination of the belt 30 by toner particles 26, and to enable a removal of such particles for toning purposes, the rollers 36 through 39 mount the conveyor belt 30 inside a toner guide structure 48 which, in the illustrated embodiment, also serves as a sealed housing 49 for the belt 30 and rollers 36 through 39.

The toner guide structure 48 is of a nonmagnetic material, such as brass or aluminum, for example. It defines a first guiding surface 50 which extends between the toner supply 25 and the toning region 12 and a second guiding surface 52 which extends between the toning region 12 and the toner supply 25. The guiding surface 50 is divided into an upwardly sloping or ramp section 54 and a contiguous downwardly sloping section 55.

As the conveyor belt 30 passes about the roller 36, it moves into proximity of the toner supply 25 and its magnets 33 cause the attraction of piles 57 of toner particles 26 to the toner guide structure 48. With the advance of the belt 30 in the direction of the arrow 40 these toner piles 57 are advanced along the ramp section 54 to the culminating point 59 thereof. If the toner particles are of a material that will retain an imposed magnetization, then the toner particles 26 are during this movement in the piles 57 subjected to a premagnetization by the belt 30 of the type disclosed in the above mentioned patent application by Thomas H. Garland et al.

A frequently encountered problem in magnetic toning is that the drum 19 will develop an electric charge at its surface which will attract toner and create an undesirable background effect. As indicated at 50' all or part of the toner guide structure 48 may be made of or coated with a plastic material that will impart an electrostatic charge on the toner piles 57 by operation of triboelectric principles. The toner particles 26 are then included in triboelectrically chargeable shells which may also be fusible to facilitate a printout of the toner. Those skilled in the art of xerography will realize that the principles of triboelectrification employed therein may be used to charge the toner particles so that they will be repelled by an electrostatic background charge. A good treatment of this subject is contained in Schaffert, op. cit. supra, Cascade Development, pp. 29-30, which describes materials and techniques for providing positively or negatively charged toner by triboelectrification. Of course, it is to be understood that toner useable in the subject apparatus has to contain magnetizable material in addition to the electrostatically chargeable shell. Also, the requisite triboelectrification materials have to be selected so that the toner assumes the same electrostatic polarity as the background charge on the drum which is to be overcome.

In accordance with an important principle of the illustrated embodiment, the roller 38 is so positioned relative to the roller 37 that the magnetic conveyor belt 30 continuously moves away from magnetic images at a location ahead of the toning region 12 to facilitate toning of the magnetic images 13. In this manner the belt 30 is spaced sufficiently from the toning region 12 to prevent an impairment of the toning process by magnetic gradients emanating from the conveyor magnets 33.

In particular, the conveyor belt is continuously moved away from the downwardly sloping toner guide section 55 so that toner which has been moved over the culmination point 59 can continue its travel by force of gravity toward the image drum surface and can leave the toner guide structure 48 by way of free fall at the edge 60.

Toner particles 26 thereupon tone the magnetic images 13 in the toning region 12 so as to form corresponding toner images 14 within such region. Upon further rotation of the drum 19, the toner images 14 reach a printing station 62 for a printout thereof on suitable media, such as paper sheets (see, for instance, Schaffert, op. cit. supra, pp. 123-25). As indicated above, the magnetizable toner particles 26 may have fusible shells for a fusion thereof to the printout medium under the influence of heat. If desired each magnetic image may be printed out repeatedly. To this effect, the rotation of the image drum 19 and the toning in the region 12 are continued while the operation of the recording station 17 is suspended. The latter includes erasing means (not shown) for clearing the drum of magnetic images of which no further printout is desired.

In accordance with a further important feature of the illustrated embodiment, the toner guide structure 48 has a protrusion 65 which is positioned to intercept toner particles 66 which are unspent in the image toning process. The roller 39 is positioned relative to the toner guide structure 48 so as to move the conveyor belt 30 into proximity of the protrusion 65 whereby the unspent toner particles 66 are attracted to the outside of the protrusion 65.

The rollers 36 and 39 thereupon cooperate in moving the conveyor belt 30 in proximity to the toner guiding section 52 so that piles 68 of unspent toner are moved along the surface 52 and are returned to the toner supply 25 for subsequent reuse. The housing 23 defines a catchbin 70 which intercepts unspent toner particles that miss the protrusion 65. These may glide toward the toner supply 25 along the inclined surface 72. Clogging is avoided by the continuous presence of the conveyor belt 30 which attracts excessive toner from the catchbin surface 72 onto the toner guide section 52 for an orderly return of unspent toner to the supply 25.

In accordance with a further important principle of the illustrated embodiment, the toner guide protrusion 65 projects sufficiently close to the image drum 19 or recording medium 16 to permit the magnetic belt 30 as it passes inside the protrusion 65 to remove excessive toner particles from the drum or recording medium as shown at 80. In this manner, the toned magnetic image 14 is automatically cleaned of surplus toner particles prior to printout.

If desired, the danger of contamination of the conveyor belt 30 with magnetic toner may be further reduced by increasing the pressure inside the sealed toner guide 48 relative to the pressure outside this toner guide. To this effect, a conventional pump 82 is connected by a pipe 83 to the space 84 inside the toner guide structure 48 as indicated at 85. The pump 82 pumps air or another desired gas into the structure 48 so that toner particles will be propelled away from, rather than drawn into, any fissure that may occur in the toner guide structure.

Additionally or in the alternative, air may be pumped from the space between the outside housing 23 and the toner guide structure 48. To this effect, a conventional air pump 88 is connected to the housing 23 by a pipe 89 which enters the housing at 90. To prevent an inrush of air at the toner intake opening 28, that opening is closed by a hinged lid 92.

The exhaust pump 88 will not only increase the pressure gradient across the wall of the toner guide structure 48, but will also prevent an escape of toner at the drum 19 to the outside environment of the drum. If the exhaust pump 88 is employed without use of the pressure pump 82, then the pipe 83 is preferably provided so that air may enter the space 84 of the structure 48, if necessary through a filter (not shown). In this manner, the pressure inside the toner guide structure 48 remains higher than the pressure in the space between this toner guide structure 48 and the outer housing 28. Toner is accordingly prevented from entering the space 84 through fissures in the toner guide structure.

It will now be recognized that the invention provides several substantial features which are broadly applicable to magnetic toning apparatus and techniques.

I claim:

1. In apparatus for conveying magnetizable toner particles from a toner supply to a toning region for toning magnetic images at said toning region, the improvement comprising in combination:
   a magnetic conveyor belt for advancing toner particles from said toner supply toward said toning region;
   toner guide means extending from said toner supply to said toning region for shielding said conveyor belt against contact by said toner particles and for guiding said advancing toner particles to said toning region;
   means for driving said conveyor belt; and
   means engaging said magnetic conveyor belt for maintaining said magnetic conveyor belt in spaced relationship to a portion of said toner guide means in the vicinity of said toning region to reduce magnetic interference with said magnetic images.

2. Apparatus as claimed in claim 1, wherein:
   said toner guide means include a downwardly sloping section permitting toner particles to slide therealong by force of gravity and into said toning region; and
   said means for maintaining said magnetic conveyor belt in said spaced relationship include means for maintaining said magnetic conveyor belt in spaced relationship to at least a portion of said downwardly sloping section.

3. Apparatus as claimed in claim 1, wherein said toner guide means:
   are of nonmagnetic material;
   are stationary relative to said conveyor belt; and
   define a gliding surface for said advancing toner particles.

4. Apparatus as claimed in claim 1, including an enclosure which houses said conveyor belt and which defines said toner guide means.

5. Apparatus as claimed in claim 4, including means for increasing the pressure inside said enclosure relative to the outside of said enclosure.

6. Apparatus as claimed in claim 1, wherein:
   said toner particles are electrically chargeable; and
   said apparatus includes means for electrically charging said toner particles.

7. Apparatus as claimed in claim 1, wherein:
   said toner particles are electrostatically chargeable by triboelectrification; and
   said toner guide means include a triboelectrically active medium for charging said toner particles.

8. In apparatus for toning in a toning region magnetic images on the surface of a magnetic image drum, the improvement comprising in combination:
   means for containing a supply of magnetizable toner particles;
   toner guide means for guiding toner particles from said toner supply to said toning region and for guiding unspent toner particles from said toning region back to said toner supply;
   a magnetic conveyor belt mounted inside said toner guide means for attracting toner particles from said toner supply to said toner guide means and for moving said attracted toner particles along said toner guide means toward said toning region, and for attracting unspent toner particles at said toning region to said toner guide means and for moving said attracted unspent toner particles along said toner guide means to said toner supply;
   means for driving said conveyor belt; and
   means engaging said magnetic conveyor belt for maintaining said magnetic conveyor belt in spaced relationship to a portion of said toner guide means in the vicinity of said toning region to reduce magnetic interference with said magnetic images.

9. Apparatus as claimed in claim 8, wherein said toner guide means are of nonmagnetic material and form an enclosure for housing said magnetic conveyor belt.

10. Apparatus as claimed in claim 9, including means for increasing the pressure inside said enclosure relative to the outside of said enclosure.

11. Apparatus as claimed in claim 8, wherein:
    said toner guide means include a section constructed and positioned to accept unspent toner particles at said toning region; and
    said magnetic conveyor belt is mounted to pass in proximity to said toner guide section to cause the attraction of unspent toner particles to said section.

12. Apparatus as claimed in claim 8, wherein:
    said magnetic conveyor belt is mounted to pass in proximity to toned images at said toning region to clean said toned images of surplus toner particles by magnetic attraction; and
    wherein said toner guide means include a section interposed between said toned images and said conveyor belt for receiving and guiding said attracted surplus toner particles away from said toning region.

13. Apparatus as claimed in claim 8, wherein:
    said toner particles are electrically chargeable; and
    said apparatus includes means for electrically charging said toner particles.

14. Apparatus as claimed in claim 8, wherein:
    said toner particles are electrostatically chargeable by triboelectrification; and
    said toner guide means include a triboelectrically active medium for charging said toner particles.

15. In apparatus for toning in a toning region magnetic images on the surface of a magnetic image drum, the improvement comprising in combination:
    means for containing a supply of magnetizable toner particles;
    an enclosure of nonmagnetic material including toner guide means for guiding toner particles from said toner supply to said toning region and for guiding unspent toner particles from said toning region back to said toner supply;
    a magnetic conveyor belt mounted inside said toner guide means for attracting toner particles from said toner supply to said toner guide means and for moving said attracted toner particles along said toner guide means toward said toning region, and for attracting unspent toner particles at said toning region to said toner guide means and for moving said attracted unspent toner particles along said toner guide means to said toner supply;
    means for driving said conveyor belt; and
    means for increasing the pressure inside said enclosure relative to the outside of said enclosure.